US United States Patent Office 2,963,341
Patented Dec. 6, 1960

2,963,341

METHOD FOR PURIFYING POLYMERIZED PHOSPHORYLAMIDE

John E. Malowan, Chattanooga, Tenn.
(Industrial Research Institute, University of Chattanooga)

No Drawing. Filed Dec. 18, 1959, Ser. No. 860,315

2 Claims. (Cl. 23—14)

This invention relates to a method for purifying polymerized phosphorylamide so as to produce flameproofing compounds, fungicides and insecticides.

This application is a continuation-in-part of Serial No. 423,852, filed on April 16, 1954, the latter, in turn, being a continuation-in-part of application Serial No. 401,224, filed December 30, 1953, now abandoned.

Processes for producing mixtures of ammonium chloride and phosphyl-nitrogen compounds are known. One such process is described in U.S. Patent No. 2,661,264 and comprises dissolving phosphoryl chloride in an inert solvent and passing ammonia into this solution until at least five moles of ammonia have been absorbed for each mole of phosphoryl chloride. The temperature is kept below 100° C. by cooling. After the ammonia absorption is concluded, the reaction mass is heated to above 100° C. but below 150° C. This latter step is important, although the chemical reaction is not fully understood. It is believed that the reaction brings about polymerization of the phosphoryl-nitrogen compound to a higher molecular weight compound. Its physical properties and some chemical properties have changed.

While the phosphoryl-nitrogen compound obtained from the reaction of phosphoryl chloride and ammonia at temperatures below 80° C. to 100° C. is soluble in water and methanol, it does not give precipitates with acids, and only with some metallic salts. On the other hand, if the phosphoryl-nitrogen compound is obtained by heating to above 100° C. and below 150° C., this compounnd still retains its solubility in water, but it now becomes insoluble in liquid anhydrous ammonia, methanol and the like, and is precipitated from its aqueous solution by acids. This phosphorylamide, after heating to above 100° C. may be called polymerized phosphorylamide.

When applying the phosphorylamide to cellulosic materials for purposes of making the latter flame resistant, the phosphorylamide has to be separated from the ammonium chloride formed simultaneously in the reaction between phosphoryl chloride and ammonia. The presence of ammonium chloride during the impregnation of cellulosic fabrics, followed by drying of the latter, would weaken the fabric to such an extent as to make the application of phosphorylamide for flameproofing purposes unworkable. The only procedure used up to now to make phosphorylamide substantially free of chlorine is to extract the ammonium chloride and polymerized phosphorylamide with liquid anhydrous ammonia or methyl alcohol containing some water. Both these procedures have considerable drawbacks and are also expensive. Extraction with liquid ammonia requires pressure vessels; and after the extraction, expensive ammonia-recovery and liquification equipment is necessary. The solubility of ammonium chloride in methanol is limited; therefore, a large extraction plant and methanol recovery plant is required.

In accordance with the present invention it has been found that polymerized phosphorylamide and ammonium chloride may be separated from their mutual aqueous solution by precipitating the polymerized phosphorylamide with acids or metallic salts. By a simple filtration, the ammonium chloride can substantially be separated as an aqueous solution. Acids which may be used for precipitation are sulphuric, hydrochloric, and nitric acid. The metallic salts which may be used are the water soluble salts of magnesium, calcium, barium, copper, lead, and the like. Although a few strong organic acids may also be used, the use of sulphuric acid as precipitant is preferable because of its low cost and the lower solubility of the sulphuric acid salt of polymerized phosphorylamide.

A recommended procedure is to dissolve the mixture of polymerized phosphorylamide and ammonium chloride in just sufficient water to obtain a solution and add sulphuric acid at the rate of half a mole of sulphuric acid for each amide group present in the polymerized phosphorylamide, then agitating and filtering. By addition of 10 to 20% of methanol to the filtrate, the yield of precipitate is increased, but the second precipitate is believed to consist of less highly polymerized phosphorylamide. Instead of first dissolving the mixture in water and then adding sulphuric acid, the polymerized phosphorylamide may be placed in a dilute aqueous solution of sulphuric acid.

Although, for some purposes, the precipitate may be used as such for flameproofing purposes, generally, it is required that the material when used on cellulosic materials be free of acid and of a pH above 7.0. This may be achieved by treating the acid salt of polymerized phosphorylamide with a solution of hydrous ammonia and methanol. The ammonium hydroxide will liberate the phosphorylamide again while the aqueous methanol will leach out any remaining ammonium chloride and the sulphate formed in the liberation of the phosphorylamide.

When water soluble salts of magnesium, calcium, barium etc. are used for the precipitation of the polymerized phosphorylamide, the latter can be recovered by treating the precipitates with an aqueous solution of ammonium carbonate. In this case the phosphorylamide will be in aqueous solution, while the metal will be in the insoluble compound. The aqueous solution may be used for flameproofing purposes directly, or the phosphorylamide may be recovered in solid form by addition of methanol. The precipitate obtained by the addition of a water soluble salt of copper or lead may be used as a fungicide or insecticide. The advantages of the processes described above over the extraction of the ammonium chloride with liquid anhydrous ammonia or methanol consist in the elimination of expensive equipment, lower cost of raw materials, and a great saving in time.

Therefore, it is a principal object of the present invention to provide a method for purifying polymerized phosphorylamide by removing ammonium chloride therefrom.

It is a further object of the present invention to provide a method, as referred to above, wherein the polymerized phosphorylamide including ammonium chloride is dissolved in water, wherein sulphuric acid is added to the solution to precipitate out polymerized phosphorylamide sulfate salt, and wherein the precipitate is washed with a mixture of methanol and ammonium hydroxide to liberate the polymerized phosphorylamide from its sulfate salt.

Another object of the present invention is to provide a method, as referred to above, wherein methanol is added to the filtrate to increase the yield of polymerized phosphorylamide sulfate salt.

Other and further objects of the present invention will hereinafter appear from the following detailed description of the invention.

*Preparation of polymerized phosphorylamide*

The polymerized phosphorylamide is prepared as follows:

(1) One hundred fifty pounds of phosphorus oxychloride ($POCl_3$) is dissolved in 150 gallons of hexane contained in an autoclave which can be cooled. Anhydrous ammonia is added slowly with agitation until about 90 pounds have been added, the temperature being kept below the boiling point of hexane (69° C.).

(2) The autoclave is sealed and the temperature of the mixture is raised to about 130° C. for about one and one half hours.

(3) The temperature is reduced, and the hexane is filtered off. The residual hexane is distilled from the filter cake.

*Preliminary purification*

The ammonium chloride is separated from the phosphorylamide by:

(1) Dissolving the filter cake in water.

(2) Adding 50 pounds of concentrated sulphuric acid to the solution. This precipitates the phosphorylamide, leaving the ammonium chloride in solution.

(3) The acidulated phosphorylamide is filtered off and dried.

(4) For use in treating cellulosic materials the acidulated phosphorylamide is dissolved in dilute ammonia, and the solution is adjusted to contain about 20% solids.

The yield of phosphorylamide from this procedure is about 85% theoretical.

The polymerized phosphorylamide is purified in accordance with the present invention as set forth in the following example:

EXAMPLE

One hundred parts by weight of a mixture of water soluble partially polymerized phosphorylamide and ammonium chloride (prepared by reacting one mole of phosphorus oxychloride with five moles of anhydrous ammonia which has been heated to about 130° C. for about one and one half hours) is dissolved in 200 parts of water. To the resultant solution is added 30 to 40 parts of sulphuric acid solution containing 50% sulphuric acid by weight. More complete precipitation of the polymerized phosphorylamide sulfate is obtained by adding to the acid solution 70 parts by weight of methanol. The polymerized phosphorylamide sulfate is recovered by filtration. The phosphorylamide sulfate is decomposed by treating with methanol containing 20% by weight of water and sufficient ammonium hydroxide to react with the sulphuric acid present.

What is claimed is:

1. A method of separating a water-soluble polymerized phosphorylamide from a mixture thereof containing ammonium chloride, said polymerized phosphorylamide having been prepared by dissolving phosphoryl chloride in an inert solvent and passing ammonia into the resulting solution until at least five moles of ammonia have been absorbed for each mole of phosphoryl chloride, the temperature being maintained below 100° C. during this absorption step, and thereafter heating the reaction mixture above 100° C. but below 150° C., which comprises treating said mixture containing water-soluble polymerized phosphorylamide and ammonium chloride in aqueous solution with one-half mole of sulphuric acid for each amide group present in the polymerized phosphorylamide, filtering out the polymerized phosphorylamide sulfate salt which precipitates, and washing the precipitate with a mixture of methanol and ammonium hydroxide to liberate the polymerized phosphorylamide from the polymerized phosphorylamide sulfate salt.

2. The method of claim 1 in which methanol is added to the filtrate to increase the yield of polymerized phosphorylamide sulfate salt.

References Cited in the file of this patent

UNITED STATES PATENTS

| | | |
|---|---|---|
| 2,596,935 | Malowan | May 13, 1952 |
| 2,642,405 | Nielsen | June 16, 1953 |
| 2,648,597 | Nielsen | Aug. 11, 1953 |
| 2,661,264 | Malowan | Dec. 1, 1953 |
| 2,661,337 | Nielsen | Dec. 1, 1953 |
| 2,678,940 | Boyer et al. | May 18, 1954 |

OTHER REFERENCES

Yost et al.: "Systematic Inorganic Chemistry," 1944, pages 107–108.

Audrieth et al.: "The Chemistry of Hydrazine," 1951, pages 28, 29 and 46.